United States Patent
Jerisk (10) Patent No.: US 11,040,389 B2
(45) Date of Patent: Jun. 22, 2021

(54) GUIDE TUBE RETAINMENT FEATURE DURING CRIMPING OF GUIDE TUBES

(71) Applicant: Continental Automotive Systems, Inc., Auburn Hills, MI (US)

(72) Inventor: Joseph G Jerisk, Burton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 109 days.

(21) Appl. No.: 16/294,992

(22) Filed: Mar. 7, 2019

(65) Prior Publication Data

US 2020/0180006 A1 Jun. 11, 2020

Related U.S. Application Data

(60) Provisional application No. 62/776,307, filed on Dec. 6, 2018.

(51) Int. Cl.
*B21D 39/04* (2006.01)
*F16L 13/14* (2006.01)
*B60G 11/27* (2006.01)

(52) U.S. Cl.
CPC ......... *B21D 39/048* (2013.01); *B21D 39/046* (2013.01); *F16L 13/141* (2013.01); *B60G 11/27* (2013.01); *F16L 2013/145* (2013.01)

(58) Field of Classification Search
CPC ... B21D 39/048; B21D 39/046; F16L 13/141; F16L 2013/145; B60G 11/27; B60G 2202/152; B60G 2206/42; B60G 2204/126; B60G 2204/4308; B60G 2206/91; B60G 2204/1262; B60G 2202/314; B60G 15/14; F16F 9/057; F16F 2226/04; Y10T 29/49826; Y10T 29/4984; Y10T 29/49845; Y10T 29/49863; Y10T 29/49906; Y10T 29/49908
USPC ............... 29/428, 434, 437, 446, 469.5, 505
See application file for complete search history.

(56) References Cited

U.S. PATENT DOCUMENTS

| | | | | |
|---|---|---|---|---|
| 4,509,244 | A * | 4/1985 | Houck | B23P 19/02 29/508 |
| 6,749,184 | B2 * | 6/2004 | Wode | F16F 9/0463 267/122 |
| 2007/0023982 | A1 * | 2/2007 | Taylor | F16F 9/0463 267/113 |
| 2010/0001446 | A1 * | 1/2010 | Oldenettel | B29D 22/023 267/122 |
| 2016/0075203 | A1 * | 3/2016 | Schallmeier | B60G 11/27 267/64.27 |

(Continued)

*Primary Examiner* — Sarang Afzali
*Assistant Examiner* — Darrell C Ford (57) ABSTRACT

A method for making an air spring assembly, including the steps of providing a bellow, a support ring, and a guide tube. The support ring is positioned relative to a bellow adapter such that a portion of the bellow adapter extends through the support ring. The bellow is then positioned such that a portion of the bellow extends over the support ring and a portion of the bellow adapter. The guide tube is then positioned relative to the bellow and the support ring, such that a portion of the bellow extends into the guide tube and the guide tube is supported by the bellow adapter, and a portion of the guide tube is supported by a ridge support fixture. The first clamp and second clamp are then moved towards the guide tube, applying force to the guide tube, simultaneously forming a first crimp and a second crimp.

7 Claims, 5 Drawing Sheets

(56) References Cited

U.S. PATENT DOCUMENTS

2020/0063817 A1\* 2/2020 Kirar .................... F16F 9/0463

\* cited by examiner

GUIDE TUBE RETAINMENT FEATURE DURING CRIMPING OF GUIDE TUBES

CROSS-REFERENCE TO RELATED APPLICATIONS

This application claims the benefit of Provisional Application 62/776,307, filed Dec. 6, 2018. The disclosure of the above application is incorporated herein by reference.

FIELD OF THE INVENTION

The invention relates generally to an air spring assembly which includes at least two crimp areas which are formed simultaneously during manufacturing.

BACKGROUND OF THE INVENTION

Suspension systems for automotive vehicles provide vehicle passengers with a more comfortable ride. Air suspension systems utilize air springs, rather than traditional coil springs. Air suspension systems provide different suspension qualities that may be preferable in some vehicles to traditional coil spring suspensions.

A conventional air spring is a device that is arranged between a vehicle body and chassis. The typical air spring has at least one working space, or cavity that is filled with compressed air. Air spring pistons typically seal the air chamber against a hydraulic shock absorber (damper).

The cavity is typically located inside a flexible tube, or bellow, which is able to flex during the operation of the air spring. The bellow is connected to a guide tube using a crimping process. During this crimping process, a steel support ring is inserted inside of the rubber bellow, the guide tube is then slid over the bellow as well as the support ring, and a portion of the guide tube supported by the support ring is crimped, connecting the support ring, bellow, and guide tube together. During this process, the guide tube is plastically deformed over the support ring with the bellow being between the support ring and the guide tube.

The air spring assembly also includes a damper rod which extends into and moves relative to a damper body. A gaiter, which surrounds a portion of the damper body and other parts of the air spring assembly, provides protection from dirt and debris during vehicle travel. An end of the gaiter is also connected to the guide tube, this is typically accomplished using a second crimping process to create a connecting portion formed as part of the guide tube, such as a flange, or other type of connection. However, this additional crimping process typically involves separate tooling, a separate manufacturing process, and increased manufacturing time, all of which increase manufacturing costs, and is not optimally efficient.

Accordingly, there exists a need for an air spring assembly which includes a guide tube where multiple crimping processes for assembling components to the guide tube may combined such that the air spring assembly is able to be manufactured more efficiently, and less costly.

SUMMARY OF THE INVENTION

The present invention is a new crimping process for an air spring assembly, which does not change cycle time, and reduces manufacturing cost because of the elimination of a secondary operation, or secondary crimping process, applied to any guide tube which requires retainment features for a gaiter. The present invention also eliminates the need for a sub-supplier to perform this secondary operation or secondary crimping process.

In an embodiment, the guide tube of an air spring assembly is plastically deformed via a crimping process to create a retainment feature, or tab, to provide a connection with an end of a gaiter. More specifically, the crimping process would create a ridge feature which facilitates a snap-fit connection to an end of the gaiter. This crimping process is performed simultaneously with another crimping process which connects a support ring, a bellow, and the guide tube together.

In an embodiment, the tooling used to perform both crimping operations includes a crimp tooth having an upper tooth and a lower tooth. The tooling includes a fixture for supporting the guide tube during the crimping process, and the guide tube plastically deforms at two locations during the crimping process.

In an embodiment, the present invention is a method for assembling a portion of an air spring assembly, including the steps of using a crimp tooth having an upper tooth and a lower tooth, and a ridge support fixture which supports both a first end and a second end of the guide tube. The guide tube is crimped using the crimp tooth such that the guide tube is deformed in one location to connect with the bellow and the support ring, and the guide tube is simultaneously deformed in another location to form the retainment feature.

In another embodiment, the crimp tooth only has a single set of teeth, and the guide tube, bellow, and support ring are positioned in the tooling such that during a first crimping process, the guide tube is deformed to attach the guide tube to the bellow and the support ring, and the assembled guide tube, bellow, and support ring are moved to provide proper alignment such that the single set of teeth may then be used to crimp a portion of the guide tube to form the retainment feature.

In one embodiment, the present invention is a method for making an air spring assembly, which includes the steps of providing a bellow, a support ring, and a guide tube. Also included is a die having a crimp tool, and the crimp tool includes a first clamp, and a second clamp. The die also includes a ridge support fixture and a bellow adapter.

The support ring is positioned relative to the bellow adapter such that a portion of the bellow adapter extends through the support ring. The bellow is then positioned such that a portion of the bellow extends over the support ring and a portion of the bellow adapter. The guide tube is then positioned relative to the bellow and the support ring, such that a portion of the bellow extends into the guide tube and the guide tube is supported by the bellow adapter, and a portion of the guide tube is supported by the ridge support fixture.

The first clamp is moved towards the guide tube at the same time as the second clamp, applying force to the guide tube, simultaneously forming a first crimp and a second crimp.

The method of the present invention also includes the steps of providing a plurality of upper crimp teeth integrally formed as part of the first clamp, providing a plurality of lower crimp teeth integrally formed as part of the first clamp, providing a plurality of upper crimp teeth integrally formed as part of the second clamp, and providing a plurality of lower crimp teeth integrally formed as part of the second clamp. The first crimp is formed using the plurality of upper crimp teeth integrally formed as part of the first clamp and the plurality of upper crimp teeth integrally formed as part of the second clamp. The second crimp is formed using the plurality of lower crimp teeth integrally formed as part of the first clamp and the plurality of lower crimp teeth integrally formed as part of the second clamp.

The method of the present invention also includes the steps of providing an edge portion integrally formed as part of the bellow adapter, and positioning the guide tube such that an end of the guide tube contacts the edge portion when the guide tube is supported by the bellow adapter.

The method of the present invention also includes the steps of providing a cylindrical portion integrally formed as part of the ridge support fixture, and positioning the guide tube such that the cylindrical portion extends into the guide tube and supports a portion of the guide tube during the formation of the second crimp as the first clamp and the second clamp apply force the guide tube.

In an alternate embodiment, the first clamp and the second clamp are moved towards the guide tube at the same time, applying force to the guide tube and deforming a portion of the guide tube to form the first crimp which connects the bellow, support ring, and guide tube to form a sub-assembly, the first clamp and the second clamp are then moved away from the guide tube.

The sub-assembly is then repositioned in the die such a portion of the guide tube is supported by the ridge support fixture and the bellow adapter. The second clamp is then moved towards the guide tube at the same time as the first clamp, applying force to the guide tube in proximity to the ridge support fixture and deforming another portion of the guide tube to form the second crimp.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
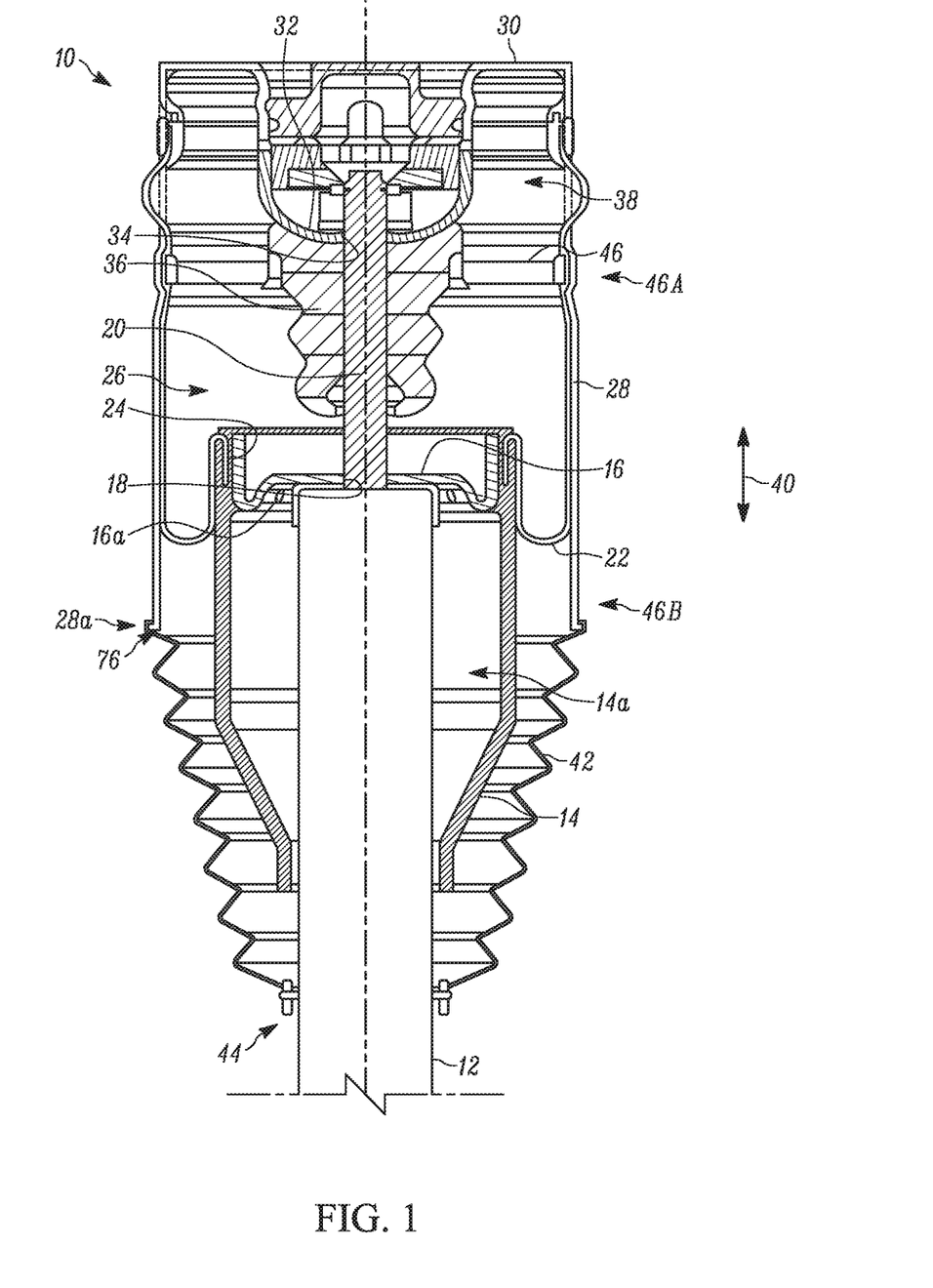
FIG. 1 is a sectional view of an air spring assembly which has undergone a crimping process, according to embodiments of the present invention.

An air spring assembly for a vehicle, which has undergone a crimping process according to the present invention is shown in FIG. 1, generally at 10. The air spring assembly 10 includes a damper body 12, and surrounding a portion of the damper body 12 is an outer piston 14. The outer piston 14 is connected to an inner piston 16, which is connected to the damper body 12 as shown. The inner piston 16 includes an aperture 18, and extending through the aperture 18 is a damper rod 20. The air spring assembly 10 also includes a bellow 22, which is flexible and able to change shape as the pistons 14,16 are moved relative to the damper rod 20. A free end 24 of the bellow 22 is clamped between portions of the outer piston 14, connecting the bellow 22 to the outer piston 14.

The bellow 22 includes a cavity, shown generally at 26, which is generally filled with air. The cavity 26 of the bellow 22 is in fluid communication with a cavity, shown generally at 14a, formed as part of the outer piston 14. The cavity 26 is in fluid communication with the cavity 14a through several apertures 16a formed as part of the inner piston 16. The bellow 22 is partially surrounded by a guide tube 28, and the guide tube 28 and the bellow 22 are connected to a top cap 30. The top cap 30 includes a base portion 32, and extending through an aperture 34 in the base portion 32 is the damper rod 20. The damper rod 20 also extends through a jounce bumper 36, which is partially surrounded by, and connected, to the top cap 30.

The top cap 30 also has a cavity, shown generally at 38, which is in fluid communication with the cavity 26 of the bellow 22 and the cavity 14a of the inner piston 14 such that the cavities 14a,26,38 function collectively as a single volume.

The top cap 30 is connected to another component of the vehicle, such the frame of the vehicle, but it is within the scope of the invention that the top cap 30 may be connected to other components of the vehicle as well. Additionally, the damper body 12 is connected to another part of the suspension system of the vehicle, such as an A-arm, or swing arm. As the A-arm moves from (operation of the vehicle) the damper body 12 and piston 14 move in either of the directions indicated by arrow 40 relative to the damper rod 20.

The air spring assembly 10 also includes a flexible outer cover, which in this embodiment is a gaiter 42. The gaiter 42 is connected to the guide tube 28 via a snap-fit connection, shown generally at 28a, and is also held in place by a clip 44 connected to the damper body 12. The gaiter 42 flexes and moves as the damper body 12 and pistons 14,16 move during travel of the vehicle.

During assembly of the air spring assembly 10, the guide tube 28 is crimped in two locations. There is a first crimp, shown generally at 46a, and a second crimp, shown generally at 46b. The air spring assembly 10 includes a support ring 46 located inside the bellow 22, which provides support for the bellow 22 and the guide tube 28 when the first crimp 46a is created.

Figure 2:
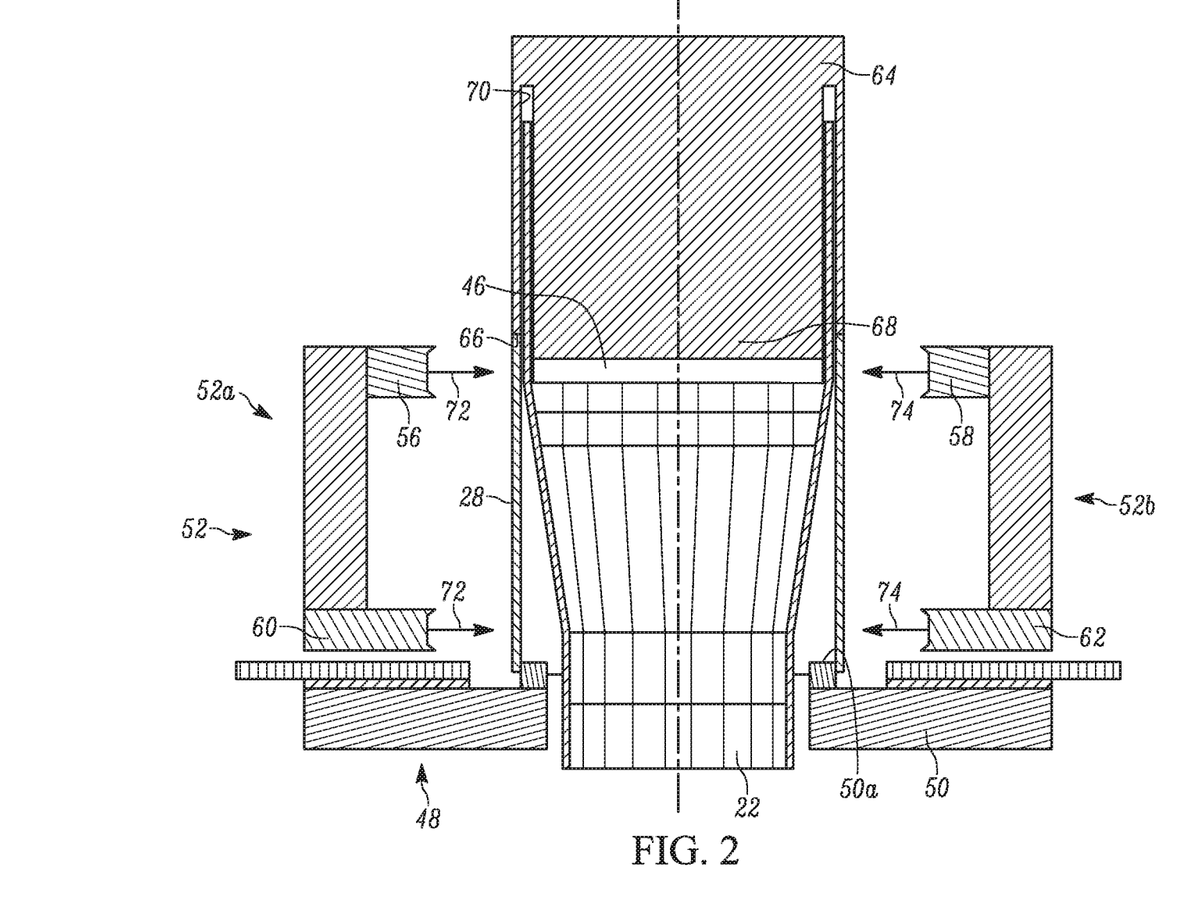
FIG. 2 is a sectional view of several components of an air spring assembly placed in a die prior to undergoing a crimping process, according to embodiments of the present invention.

Referring to FIG. 2, several components of the air spring assembly 10 are shown placed in a manufacturing die, shown generally at 48. The die 48 includes a ridge support structure 50 having a cylindrical portion 50a which extends into the guide tube 28. While in FIG. 2 the ridge support structure 50 is shown as a sectional view, the ridge support structure 50 is cylindrical in shape, such that a portion of the guide tube 28 circumscribes the cylindrical portion 50a, and the cylindrical portion 50a contacts part of the inner surface of the guide tube 28. The die 48 also includes a crimp tool, shown generally at 52. The crimp tool 52 includes a first clamp, shown generally at 52a, and a second clamp, shown generally at 52b.

The first clamp 52a includes a plurality of upper crimp teeth, one of which is shown at 56, and the second clamp 52b also has a plurality of upper crimp teeth, one of which is shown at 58. The first clamp 52a also includes a plurality of lower crimp teeth, one of which is shown at 60, and the second clamp 52b also has a plurality of lower crimp teeth, one of which is shown at 62.

During assembly, the bellow 22, guide tube 28, and the support ring 46 are placed in the die 48 as shown in FIG. 2. The die 48 includes a bellow adapter 64, and the bellow adapter 64 includes a cylindrical edge portion 66. The bellow adapter 64 also includes a support portion 68, and a cylindrical recess 70. Initially, the support ring 46 is first positioned such that part of the support portion 68 extends through the support ring 46, and the support ring 46 is supported by the support portion 68. The bellow 22 is then positioned such that a portion of the bellow 22 extends into the cylindrical recess 70 as shown in FIG. 2, and the support ring 46 is located inside the bellow 22. The guide tube 28 is then positioned such that a portion of the bellow 22 extends through the guide tube 28, and an end of the guide tube 28 is in contact with the edge portion 66 of the guide tube 28.

Next, the ridge support fixture 50 is positioned such that the cylindrical portion 50a extends into the guide tube 28, as shown in FIG. 2, such that the cylindrical portion 50a supports an end of the guide tube 28. Then, the first clamp 52a is moved in the direction of arrows 72, and the second clamp 52b is moved in the direction of arrows 74, such that each of the crimp teeth 56,58,60,62 apply force to the guide tube 28, deforming the guide tube 28. More specifically, as the first clamp 52a is moved in the direction of arrows 72 and applies force to the guide tube 28, and the second clamp 52b is moved in the direction of arrows 74 and applies force to the guide tube 28, the upper crimp teeth 56,58 form the first crimp 46a, and the lower crimp teeth 60,62 form the second crimp 46b. As force is applied to the guide tube 28, the support ring 46 supports the guide tube 28 in the area of the first crimp 46a, and the cylindrical portion 50a supports the guide tube 28 in the area of the second crimp 46b, such that the guide tube 28 is deformed to create the desired shape.

Figure 3:
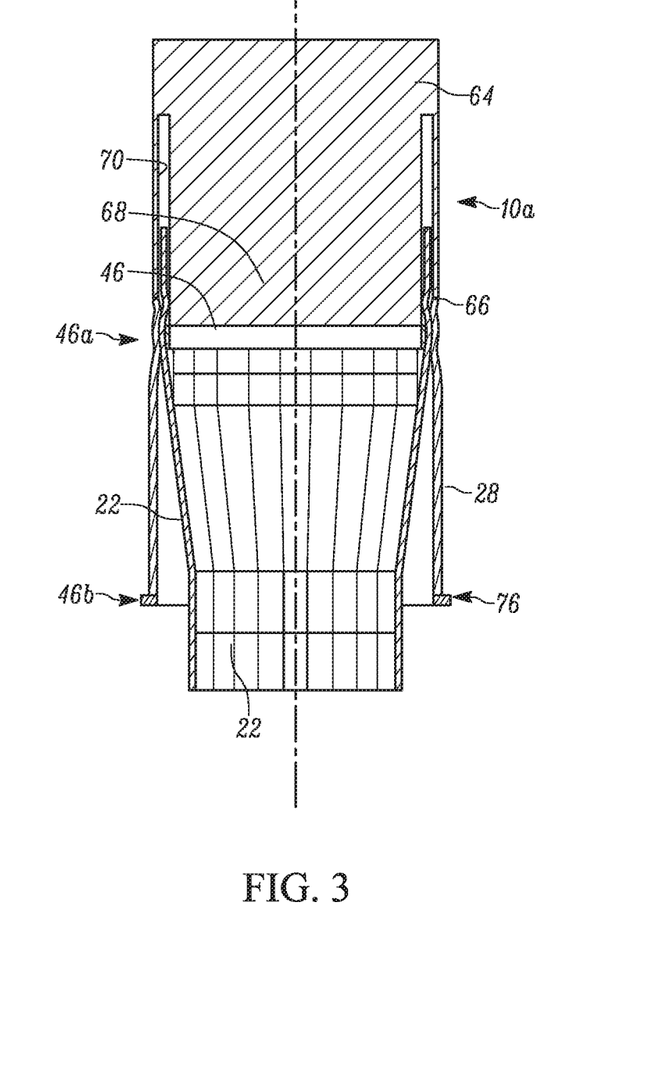
FIG. 3 is a sectional view of several components of an air spring assembly placed in a die after undergoing a crimping process, according to embodiments of the present invention.

Referring now to FIG. 3, the bellow 22, guide tube 28, and the support ring 46 are shown still in the die 48, and the crimps 46a,46b have been formed. The first crimp 46a connects the bellow 22, guide tube 28, and the support ring 46, such that these components may be removed and remain connected together as a sub-assembly, shown generally at 10a in FIG. 3. The second crimp 46b forms a retainment feature, shown generally at 76, which is used for providing the snap-fit connection 28a between the retainment feature 76 and an end of the gaiter 42. Once the sub-assembly 10a is removed from the die 48, the remaining components are then assembled.

Figure 4A:
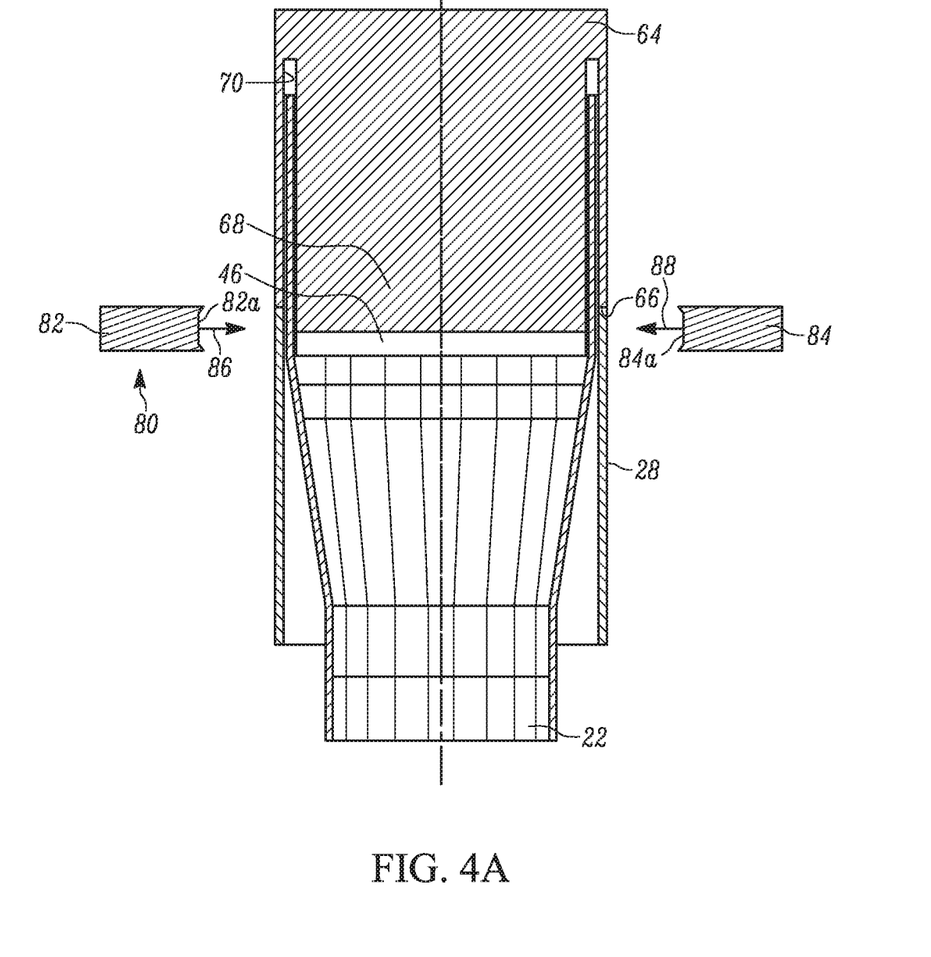
FIG. 4A is a sectional view of several components of an air spring assembly placed in a die prior to undergoing a second embodiment of a crimping process, according to embodiments of the present invention.
Figure 4B:
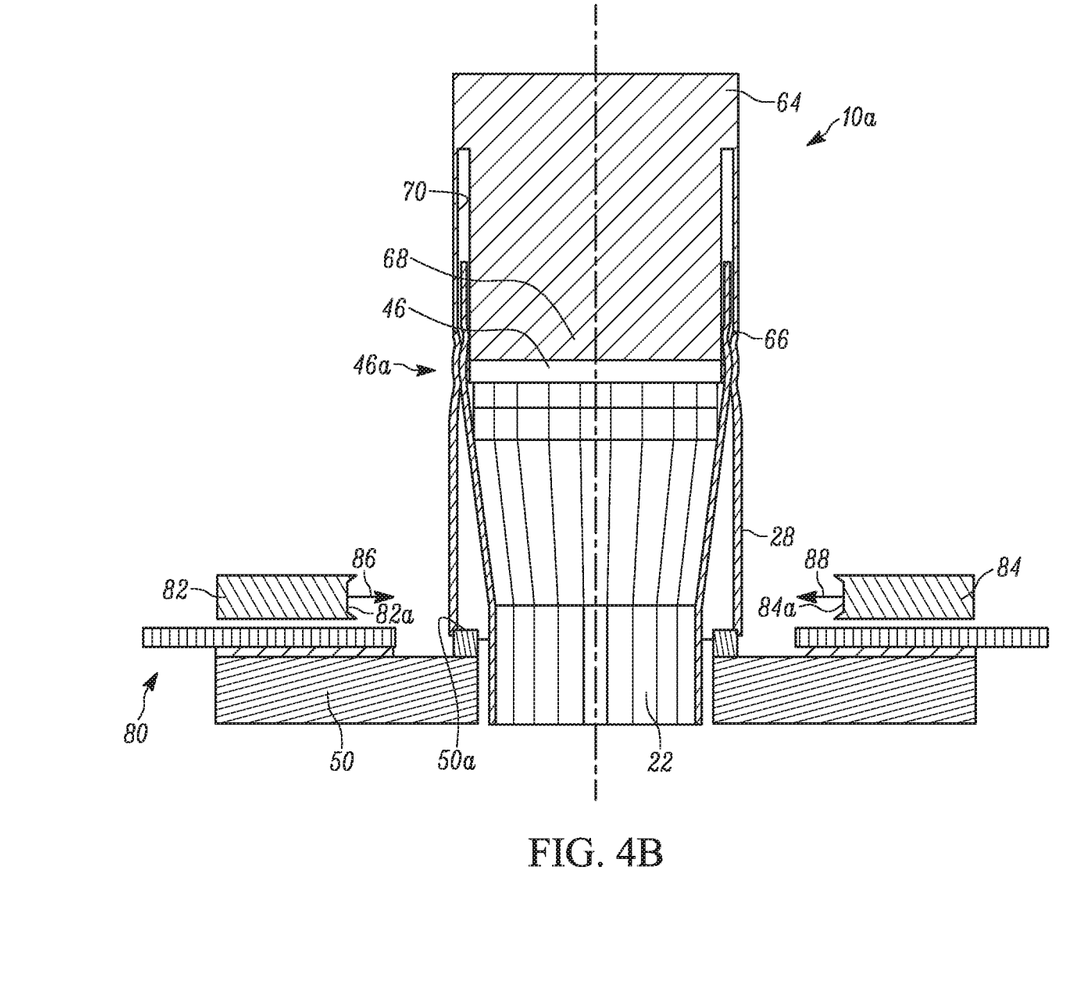
FIG. 4B is a sectional view of several components of an air spring assembly placed in a die after undergoing a second embodiment of a crimping process, according to embodiments of the present invention.

An alternate embodiment of the present invention is shown in FIGS. 4A-4B, with like numbers referring to like elements. In this embodiment, there is a different crimp tool 80, where the crimp tool 80 in this embodiment has a first clamp 82 and a second clamp 84, the first clamp 82 has a first plurality of crimp teeth 82a, and the second clamp 84 has a second plurality of crimp teeth 84a. There are two steps in the crimping process in this embodiment. In this embodiment, during the first step, the bellow 22, guide tube 28, and the support ring 46 are again placed in the die 48, as shown in FIG. 4A, in a similar manner as described in the previous embodiment. The first clamp 82 is moved in the direction of arrow 86, and the second clamp 84 is moved in the direction of arrow 88, such that each of the crimp teeth 82a,84a apply force to the guide tube 28, deforming the guide tube 28, forming the first crimp 46a, connecting the bellow 22, guide tube 28, and the support ring 46 together to form the sub-assembly 10a in a similar manner to the previous embodiment. As force is applied to the guide tube 28, the support ring 46 supports the guide tube 28 in the area of the first crimp 46a. The first clamp 82 and the second clamp 84 are then moved away from the guide tube 28.

However, in this embodiment, the second step includes the sub-assembly 10a being moved such that the sub-assembly 10a is placed in a second position relative to the crimp tool 80, shown in FIG. 4B. Next, the ridge support fixture 50 is positioned such that the cylindrical portion 50a extends into the guide tube 28 in a similar manner to the previous embodiment. Again, the first clamp 82 is moved in the direction of arrow 86, and the second clamp 84 is moved in the direction of arrow 88, such that each of the crimp teeth 82a,84a apply force to the guide tube 28, deforming the guide tube 28, forming the second crimp 46b. As force is applied to the guide tube 28, the cylindrical portion 50a supports the guide tube 28 in the area of the second crimp 46b, such that the guide tube 28 is deformed to create the desired shape.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for making an air spring assembly, comprising the steps of:
   providing a bellow;
   providing a support ring; providing a guide tube; providing a die;
   providing a crimp tool being part of the die; providing a first clamp being part of the crimp tool;
   providing a second clamp being part of the crimp tool; providing a ridge support fixture being part of the die;
   providing a bellow adapter being part of the die;
   positioning the support ring relative to the bellow adapter such that a portion of the bellow adapter extends through the support ring;
   positioning the bellow such that a portion of the bellow extends over the support ring and a portion of the bellow adapter;
   positioning the guide tube relative to the bellow and the support ring, such that a portion of the bellow extends into the guide tube and the guide tube is supported by the bellow adapter, and a portion of the guide tube is supported by the ridge support fixture;
   moving the first clamp towards the guide tube, applying force to the guide tube; and
   moving the second clamp towards the guide tube at the same time as the first clamp, applying force to the guide tube, and simultaneously forming a first crimp and a second crimp.

2. The method of claim 1, further comprising the steps of:
   providing a plurality of upper crimp teeth integrally formed as part of the first clamp;
   providing a plurality of lower crimp teeth integrally formed as part of the first clamp;
   providing a plurality of upper crimp teeth integrally formed as part of the second clamp; and providing a plurality of lower crimp teeth integrally formed as part of the second clamp;
forming the first crimp using the plurality of upper crimp teeth integrally formed as part of the first clamp and the plurality of upper crimp teeth integrally formed as part of the second clamp;
forming the second crimp using the plurality of lower crimp teeth integrally formed as part of the first clamp and the plurality of lower crimp teeth integrally formed as part of the second clamp.

3. The method of claim 1, further comprising the steps of:
providing an edge portion integrally formed as part of the bellow adapter;
positioning the guide tube such that an end of the guide tube contacts the edge portion when the guide tube is supported by the bellow adapter.

4. The method of claim 1, further comprising the steps of:
providing a cylindrical portion integrally formed as part of the ridge support fixture;
positioning the guide tube such that the cylindrical portion extends into the guide tube and supports a portion of the guide tube during the formation of the second crimp as the first clamp and the second clamp apply force to the guide tube.

5. A method for making an air spring assembly, comprising the steps of:
providing a bellow;
providing a support ring;
providing a guide tube;
providing a die;
providing a crimp tool being part of the die;
providing a first clamp being part of the crimp tool;
providing a second clamp being part of the crimp tool;
providing a first plurality of teeth being part of the first clamp;
providing a second plurality of teeth being part of the second clamp;
providing a ridge support fixture being part of the die; and
providing a bellow adapter being part of the die;
positioning the support ring relative to the bellow adapter such that a portion of the bellow adapter extends through the support ring;
positioning the bellow such that a portion of the bellow extends over the support ring and a portion of the bellow adapter;
positioning the guide tube relative to the bellow and the support ring, such that a portion of the bellow extends into the guide tube and the guide tube is supported by the bellow adapter;
moving first clamp towards the guide tube;
moving the second clamp towards the guide tube at the same time as the first clamp, applying force to the guide tube and deforming a portion of the guide tube to form a first crimp which connects the bellow, support ring, and guide tube to form a sub-assembly;
moving the first clamp and the second clamp away from the guide tube;
repositioning the sub-assembly in the die such a portion of the guide tube is supported by the ridge support fixture and the bellow adapter;
moving the second clamp towards the guide tube at the same time as the first clamp, applying force to the guide tube in proximity to the ridge support fixture and deforming another portion of the guide tube to form a second crimp.

6. The method of claim 5, further comprising the steps of:
providing an edge portion integrally formed as part of the bellow adapter;
positioning the guide tube such that an end of the guide tube contacts the edge portion when the guide tube is supported by the bellow adapter.

7. The method of claim 5, further comprising the steps of:
providing a cylindrical portion integrally formed as part of the ridge support fixture;
positioning the guide tube such that the cylindrical portion extends into the guide tube and supports a portion of the guide tube during the formation of the second crimp as the first clamp and the second clamp apply force the guide tube.

* * * * *